United States Patent
Sasaki et al.

(10) Patent No.: US 7,590,670 B2
(45) Date of Patent: Sep. 15, 2009

(54) MANAGEMENT SYSTEM OF DIFFERENCE DATA AMONG SERVERS AND CONTROL METHOD OF INFORMATION PROCESSING APPARATUS

(75) Inventors: Daisuke Sasaki, Ebina (JP); Hiroyuki Igata, Yamato (JP)

(73) Assignee: Hitachi, Ltd., Tokyo (JP)

( * ) Notice: Subject to any disclaimer, the term of this patent is extended or adjusted under 35 U.S.C. 154(b) by 424 days.

(21) Appl. No.: 10/998,284

(22) Filed: Nov. 23, 2004

(65) Prior Publication Data

US 2005/0210465 A1 Sep. 22, 2005

(30) Foreign Application Priority Data

Mar. 16, 2004 (JP) ............................... 2004-074627

(51) Int. Cl.
*G06F 7/00* (2006.01)
(52) U.S. Cl. ..................... 707/203; 707/200; 717/168
(58) Field of Classification Search ...................... None
See application file for complete search history.

(56) References Cited

U.S. PATENT DOCUMENTS

| | | | | | |
|---|---|---|---|---|---|
| 5,546,539 | A | * | 8/1996 | Poling | 707/201 |
| 5,586,322 | A | * | 12/1996 | Beck et al. | 707/200 |
| 5,600,834 | A | * | 2/1997 | Howard | 707/201 |
| 5,630,116 | A | * | 5/1997 | Takaya et al. | 707/201 |
| 5,778,389 | A | * | 7/1998 | Pruett et al. | 707/204 |
| 6,272,536 | B1 | * | 8/2001 | van Hoff et al. | 709/217 |
| 6,938,045 | B2 | * | 8/2005 | Li et al. | 707/100 |
| 7,054,910 | B1 | * | 5/2006 | Nordin et al. | 709/208 |
| 7,127,477 | B2 | * | 10/2006 | Duncombe et al. | 707/203 |
| 7,228,317 | B1 | * | 6/2007 | Epstein et al. | 707/203 |
| 7,228,319 | B1 | * | 6/2007 | Fuchs | 707/204 |
| 7,464,117 | B2 | * | 12/2008 | Kaplan et al. | 707/201 |
| 7,529,780 | B1 | * | 5/2009 | Braginsky et al. | 707/203 |
| 2003/0120685 | A1 | * | 6/2003 | Duncombe et al. | 707/200 |
| 2003/0220944 | A1 | * | 11/2003 | Lyman Schottland et al. | 707/203 |
| 2004/0098418 | A1 | * | 5/2004 | Hein | 707/201 |

FOREIGN PATENT DOCUMENTS

| | | |
|---|---|---|
| JP | 2001-175492 | 6/2001 |
| JP | 2003-288253 A | 10/2003 |

\* cited by examiner

*Primary Examiner*—Neveen Abel Jalil
*Assistant Examiner*—Christyann R Pulliam
(74) *Attorney, Agent, or Firm*—Townsend and Townsend and Crew LLP (57) ABSTRACT

A management system of difference data among servers compares files stored a first server and files stored in a second server. Information associates each file with a software product that produced the file. Contents of files that are stored in both the first server and in the second server are compared. If two files are judged to be different in contents, then the product name of the software product associated with file is output.

8 Claims, 9 Drawing Sheets

| PRODUCT NAME | FILE NAME | FILE ATTRIBUTE | SETUP COMPARISON METHOD | SETUP SYNCHRONIZATION METHOD |
|---|---|---|---|---|
| OS | /stand/vmunix | EXECUTABLE FILE | --- | --- |
| | /stand/system | SETUP FILE | COMP-A | COPY-A |
| | /usr/TT_DB/table.ind | DATA FILE | --- | --- |
| | ⋮ | ⋮ | ⋮ | ⋮ |
| APP1 | /var/abc/app1 | EXECUTABLE FILE | --- | --- |
| | /var/abc/app1.conf | SETUP FILE | COMP-B | COPY-B |
| | /var/abc/app1.data | DATA FILE | --- | --- |
| | ⋮ | ⋮ | ⋮ | ⋮ |

| SERVER ID | SERVER GROUP ID |
|---|---|
| server01 | 1 |
| server02 | 1 |
| server03 | 1 |
| server04 | 2 |
| server05 | 2 |
| ⋮ | ⋮ |

| FILE NAME |
|---|
| /stand/vmunix |
| /stand/system |
| /usr/TT_DB/table.ind |
| ⋮ |

| PRODUCT NAME | FILE NAME | FILE ATTRIBUTE | SETUP COMPARISON METHOD | SETUP SYNCHRONIZATION METHOD |
|---|---|---|---|---|
| OS | /stand/vmunix | EXECUTABLE FILE | --- | --- |
| | /stand/system | SETUP FILE | COMP-A | COPY-A |
| | /usr/TT_DB/table.ind | DATA FILE | --- | --- |
| | ⋮ | ⋮ | ⋮ | ⋮ |
| APP1 | /var/abc/app1 | EXECUTABLE FILE | --- | --- |
| | /var/abc/app1.conf | SETUP FILE | COMP-B | COPY-B |
| | /var/abc/app1.data | DATA FILE | --- | --- |
| | ⋮ | ⋮ | ⋮ | ⋮ |

| FILE NAME | PRODUCT NAME | FILE ATTRIBUTE |
|---|---|---|
| /stand/vmunix | OS | EXECUTABLE FILE |
| /var/abc/app1.conf | APP1 | SETUP FILE |
| ⋮ | ⋮ | ⋮ |

Fig. 7

| SETUP COMPARISON METHOD | DATA ITEM | COMPARISON METHOD |
|---|---|---|
| COMP-A | ABC | CHARACTER STRING |
| | DEF | BINARY |
| | GHI | NUMBER (HEXADECIMAL) |
| COMP-B | JKL | NUMBER (BINARY) |
| | MNO | CHARACTER STRING |
| | PQR | NUMBER (DECIMAL) |

Fig. 8A

| SETUP SYNCHRONIZATION METHOD | DATA ITEM | SYNCHRONIZATION METHOD |
|---|---|---|
| COPY-A | ABC | COPY ITEM |
| | DEF | COPY ITEM |
| | GHI | COPY ITEM |
| COPY-B | --- | COPY |

MANAGEMENT SYSTEM OF DIFFERENCE DATA AMONG SERVERS AND CONTROL METHOD OF INFORMATION PROCESSING APPARATUS

CROSS-REFERENCE TO RELATED APPLICATIONS

The present application claims priority upon Japanese Patent Application No. 2004-74627 filed on Mar. 16, 2004, which is herein incorporated by reference.

BACKGROUND OF THE INVENTION

1. Field of the Invention

The present invention relates to a management system of difference data among servers and a control method of information processing apparatus.

2. Description of the Related Art

Information processing systems today are occasionally provided with a plurality of servers installed with the same software products for improved processing capability and fault tolerance, thus executing the processings in a distributed manner among the plurality of servers. Some merchandise ordering systems using the Internet, for example, have a plurality of servers (Web servers) installed with WWW (World Wide Web) server software. In such merchandise ordering systems, ordering data received via the Internet is processed by a plurality of Web servers in a distributed manner.

When a software product is installed, various software product files are generated on the server including executable and setup files. Among the setup files of the WWW server software are those files storing setup information for communication through HTTP (Hyper Text Transfer Protocol). File contents being changed in the event of an operational mistake by the administrator, the server may become faulty, failing to operate as intended by the administrator.

In the case of such a fault, the files of the faulty server are compared with those of another server installed with the same software product as one of the investigations into the cause of the fault.

However, if differences are found in a file, what will be affected by that file and the details of the differences are verified file by file by manpower. For this reason, if a large number of files are found to have differences, a considerable amount of time is needed to grasp the cause of the server's fault and restore the server from the fault.

SUMMARY OF THE INVENTION

In light of the foregoing, it is an object of the present invention to provide a management system of difference data among servers and a control method of information processing apparatus.

In order to achieve the above and other objects, according to a major aspect of the present invention there is provided a management system of difference data among servers, the management system having a CPU and a memory being communicably connected to first and second servers installed with one or a plurality of software products, the management system comprising a configuration information storage unit, for storing file names including file path information generated by the installation of the software products in correspondence with product names that are information indicating by the installation of which of the software products the files have been generated; a file name storage unit for storing the file names of the files possessed by the first server; a file acquisition unit for referencing the file names of the first server stored in the file name storage unit and acquiring the files indicated by the file name from the first and second servers; a file comparison unit for comparing the contents of the files of the first and second servers acquired from the first and second servers; and a difference information output unit for, if the two files are judged to be different in contents by the file comparison unit, acquiring the product name corresponding to the file name of the file from the configuration information storage unit and outputting the file name and the acquired product name.

BRIEF DESCRIPTION OF THE DRAWINGS

The above and other objects, aspects, features and advantages of the present invention will become more apparent from the following detailed description when taken in conjunction with the accompanying drawings, in which.

DETAILED DESCRIPTION OF THE INVENTION

<Overall System Configuration>

Figure 1:
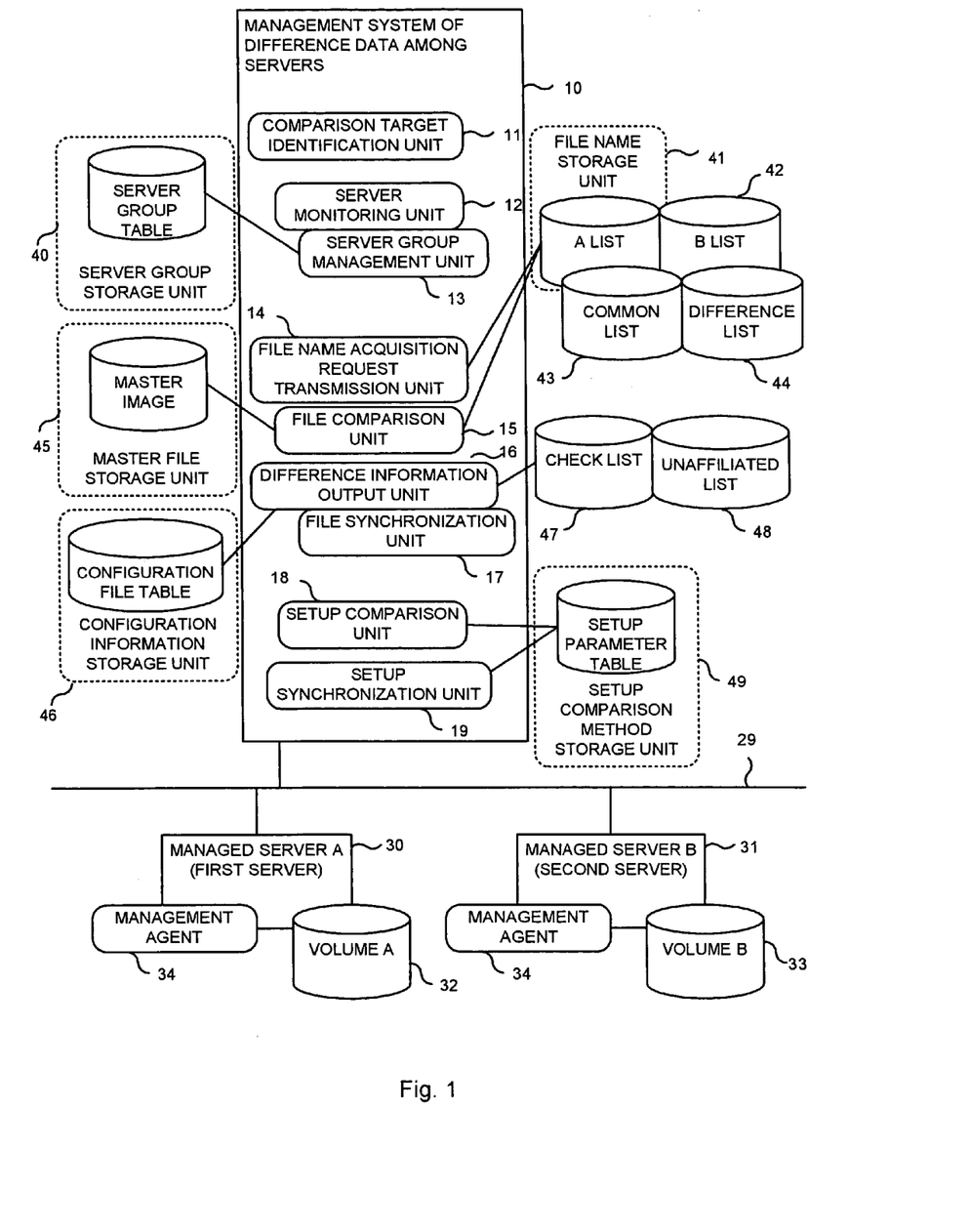
FIG. 1 is a view showing an overall configuration of an information processing apparatus including a management system of difference data among servers according to the present embodiment.

FIG. 1 is an overall configuration diagram of an information processing system including a management system of difference data among servers according to an embodiment of the present invention. A management system of difference data among servers 10, designed as a server management program, is implemented as the server management program is installed in an information processing apparatus 20 shown in FIG. 2.

Figure 2:
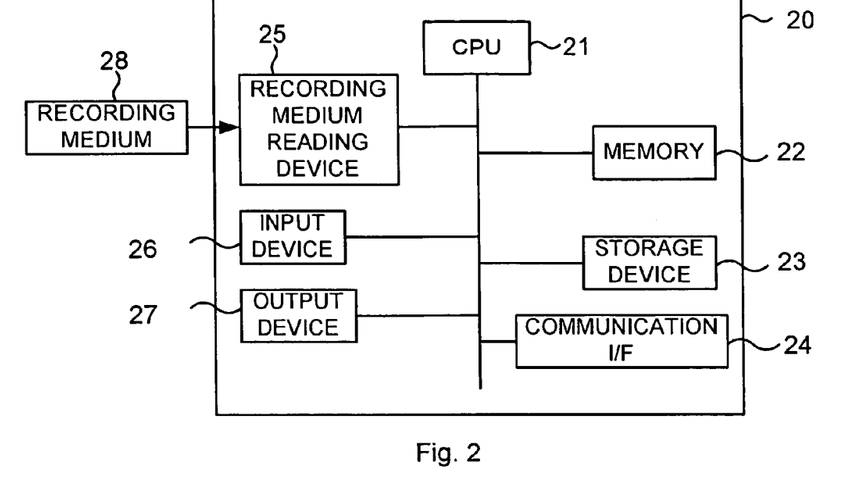
FIG. 2 is a view showing a hardware configuration of the information processing apparatus according to the present embodiment.

FIG. 2 is a view showing a hardware configuration of the information processing apparatus 20 according to the present embodiment. The information processing apparatus 20 is provided with a CPU 21, a memory 22, a storage device 23, a communication interface 24, a recording medium reading device 25, an input device 26 and an output device 27. It is to be noted that the management system of difference data among servers 10 may be alternatively implemented, for example, through the coordinated operation of a plurality of information processing apparatuses in a cluster configuration.

The CPU 21 governs the overall control of the information processing apparatus 20, implementing the management system of difference data among servers 10 by executing programs stored in the memory 22 or the storage device 23.

The recording medium reading device 25 is intended to read the programs and data recorded on a recording medium 28. The programs and data read are stored in the memory 22 or the storage device 23. Among media that can be used as the recording medium 28 are a flexible disk, CD-ROM and semiconductor memory. The recording medium reading device 25 may be built in the information processing apparatus 20 or attached externally thereto. The storage device 23 is, for example, a hard disk device or semiconductor storage device.

The input device 26 is used for data entries to the information processing apparatus 20 by the administrator, etc. A device such as a keyboard or mouse is used as the input device 26.

The output device 27 is intended to externally output information. A device such as a display or printer is used as the output device 27.

The communication interface 24 is intended for data exchange with a managed server A (first server) 30 and a managed server B (second server) 31 via a communication network 29.

The communication network 29 is, for example, a LAN (Local Area Network). In addition to a LAN, various other alternatives may be used including a SCSI (Small Computer System Interface)-compliant communication interface. The managed servers A 30 and B 31 are, for example, server modules 52 in a blade server 50 shown in FIG. 3. The blade server 50 is configured by equipping a single enclosure 51 with a plurality of the server modules 52. Each of the server modules 52 is an information processing device provided with a CPU, a memory, a hard disk drive and so on. It is to be noted that each of the server modules 52 may alternatively be unprovided with a hard disk drive, with the data stored in an external storage device connected to allow communication. On the other hand, each of the server modules 52 is installed with software products including an operating system, middleware and application software.

Figure 3:
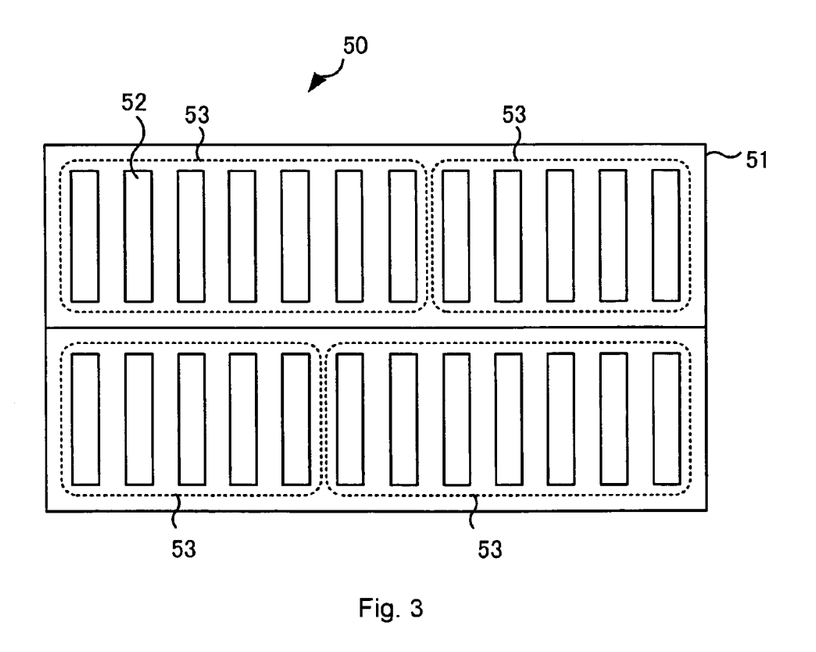
FIG. 3 is a view showing a blade server according to the present embodiment.

In the blade server 50, a case may arise in which the same processings are performed by the plurality of server modules 52. Among such examples is an assembly of the server modules 52 performing a database processing or batch processing. Such an assembly of the server modules 52 is referred to as a server group 53. The server modules 52 in the same server group 53 are installed with the same software products. That is, the server modules 52 in the same server group 53 have the same file configuration as each other. The operation of each of the server modules 52 is determined by the contents of the files generated by the installation of the software products. For example, the setup file for HTTP communication is in the server module 52 installed with the WWW server software. The administrator can set up the operation of the server module 52 by editing the contents of this setup file. And, in the server modules 52 belonging to the same server group 53, the contents of the setup files are the same. The contents of a setup file of the certain server module 52 may be changed unintentionally as a result of an operational mistake by the administrator, software fault or other reason. Such an incident occasionally results in the server module 52 becoming faulty, failing to operate as intended by the administrator. In the case of detection of such a fault, the cause of the fault can be investigated by selecting the server module 52 in the same server group 53 other than that server module 52 and verifying the differences between the files of the server modules 52. In the present embodiment, the managed servers A 30 and B 31 are the server modules 52 belonging to the same server group 53.

The managed server A 30 stores files in a volume A 32. The managed server B 31 stores files in a volume B 33. The volumes A 32 and B 33 are storage devices such as hard disk drives provided in the server modules 52. On the other hand, a management agent 34 is executed in the managed servers A 30 and B 31. The management agent 34 is a program for the managed servers A 30 and B 31 to communicate with the management system of difference data among servers 10.

The server management system 10 is provided with functional blocks—a comparison target identification unit 11, a server monitoring unit 12, a server group management unit 13, a file name acquisition request transmission unit 14, a file comparison unit 15, a difference information output unit 16, a file synchronization unit 17, a setup comparison unit 18 and a setup synchronization unit 19. These functional blocks are implemented as the CPU, making up the server management system 10, which executes the programs stored in the memory of the information processing apparatus.

The server management system 10 is also provided with a server group table (server group storage unit) 40, an A list (file name storage unit) 41, a B list 42, a common list 43, a difference list 44, a master image (master file storage unit) 45, a configuration file table 46, a check list 47, an unaffiliated list 48 and a setup parameter table (setup comparison method storage unit) 49.

Figure 4:
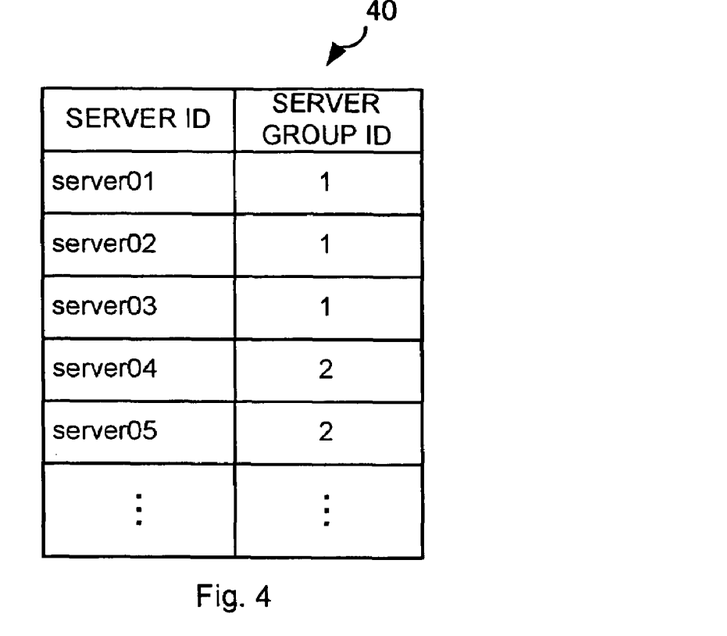
FIG. 4 is a view showing a server group table according to the present embodiment.

FIG. 4 is a view showing the server group table 40 according to the present invention. The server group table 40 has "Server ID" and "Server group ID" columns. The "Server ID" column stores IDs for identifying the server modules 52 housed in the blade server 50. The "Server group ID" column stores IDs for identifying the server groups 53 to which the server modules 52 belong.

Figure 5:
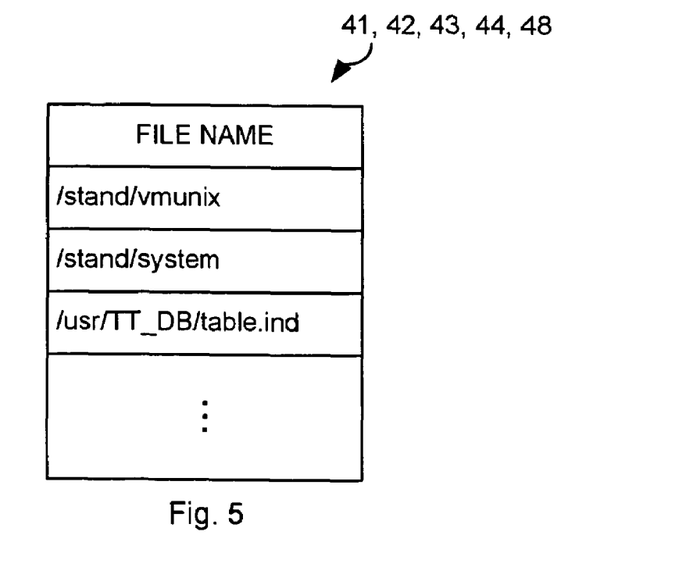
FIG. 5 is a view showing an A list, a B list, a common list, a difference list, and a nonaffiliated list according to the present embodiment.

FIG. 5 is a view showing the A list according to the present embodiment. The A list 41 stores file names including path names of the files possessed by the managed server A 30. The B list 42 stores file names including path names of the files possessed by the managed server B 31 in the same format. On the other hand, the common list 43 stores file names of the files existing in both the A and B lists 41 and 42. The difference list 44 stores, of those files indicated by the file names stored in the common list 43, file names of the files whose contents are different between the managed servers A 30 and B 31. The unaffiliated list 48 also stores file names. Detailed description of the contents stored in the lists 41 to 44 and 48 will be given later.

The master image 45 stores file names of the software products installed in the server modules 52. The master image 45 is employed when a software product is installed in the server modules 52. First, the files to be installed are stored in the master image 45. Next, the files stored in the master image 45 are distributed to the individual server modules 52. It is to be noted that we assume that the master image 45 is provided for each of the server groups 53 of the blade server 50.

Figure 6:
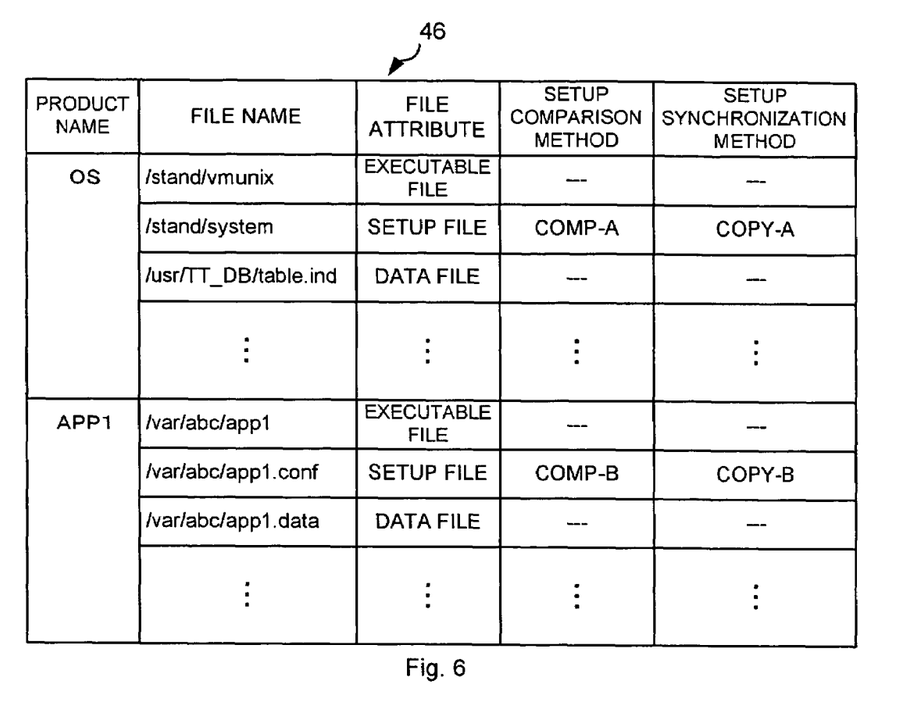
FIG. 6 is a view showing a configuration file table according to the present embodiment.

FIG. 6 is a view showing the configuration file table 46 according to the present embodiment. The configuration file table 46 has "Product name", "File name", "File attribute", "Setup comparison method" and "Setup synchronization method" columns. The "Product name" column stores information indicating the software modules installed in the server modules 52. Among examples are "OS" and "APP1" as shown in FIG. 6. As shown in FIG. 6, the file names are in correspondence with a product name. Additionally, a file attribute, setup comparison method and setup synchronization method are stored in correspondence with each file name. The file attribute is intended to identify whether the file is an executable, setup or data file. In the "Setup comparison method" column, information is set up that indicates a comparison method used to make a comparison in conformity with a specific rule instead of simply comparing the setup files one byte at a time. On the other hand, if files are different between the two server modules 52, copying one of the files to the other file will bring the files of the two server modules 52 into the same state. Thus, bringing the files of the two server modules 52 into the same state by copying one of the files is called file synchronization. In the case of a setup file, one may wish to synchronize files in conformity with a specific rule instead of simple copying. In such a case, information is set in the "Setup synchronization method" that indicates a file synchronization method. The details of the setup comparison and synchronization methods are stored in the setup parameter table 49 that will be described later.

Figure 7:
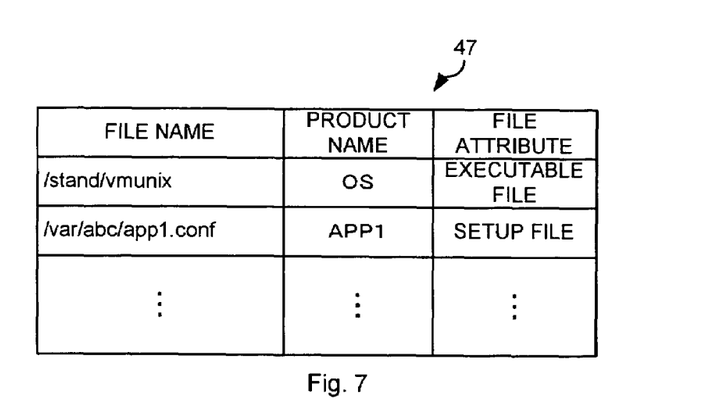
FIG. 7 is a view showing a check list according to the present embodiment.

FIG. 7 is a view showing the check list 47 according to the present embodiment. The check list 47 is generated by acquiring the product name and the file attribute corresponding to the file name from the configuration file table 46 using the A, B, common and difference lists 41, 42, 43 and 44 as inputs. That is, when the difference list 44 is an input, the check list 47 stores the file names, product names and file attributes of those files whose contents are different between the managed servers A 30 and B 31.

Figure 8A:
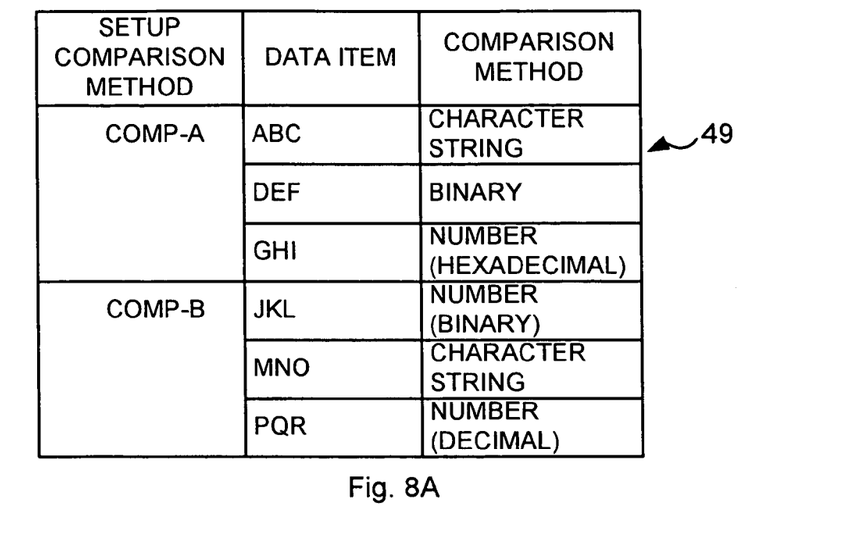
FIGS. 8A and 8B are views showing setup parameter tables according to the present embodiment.

FIGS. 8A and 8B are views showing the setup parameter tables 49 according to the present embodiment. FIG. 8A is a view showing the setup parameter table 49 that stores the setup comparison methods. This setup parameter table 49 stores, for each of the setup comparison methods stored in correspondence with a file name in the configuration file table 46, the data items possessed by that file and the data item-by-data item comparison methods. In the case of FIG. 8A, for example, the setup parameter table 49 stores the fact that a data item "ABC" should be compared as a character string and a data item "GHI" as a hexadecimal value for a "COMP-A" setup comparison method. In the case of a setup file, the same data item may be written in a plurality of ways. Among examples are values that can be written in both decimal and hexadecimal forms. For this reason, determining a comparison method for each data item allows comparing the data item values to find out whether they are equal.

Figure 8B:
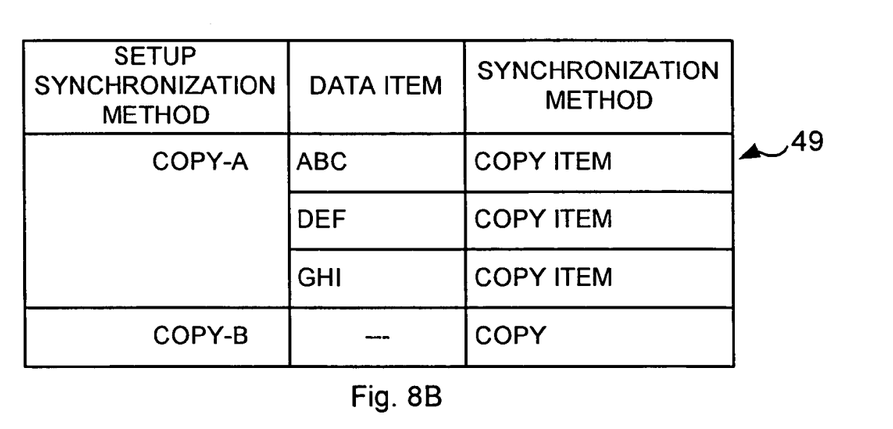

FIG. 8B is a view showing the setup parameter table 49 that stores the setup synchronization methods. This setup parameter table 49 stores, for each of the setup synchronization methods stored in correspondence with a file name in the configuration file table 46, the data items possessed by that file and the data item-by-data item synchronization methods. In the case of FIG. 8B, for example, the setup parameter table 49 stores the fact that data items "ABC", "DEF" and "GHI" should be copied item by item for a "COPY-A" setup synchronization method. That is, when a file with "COPY-A" set as the setup synchronization method, is copied from one of the server modules 52 to the other server module 52, values are copied data item by data item instead of simple copying.

Depending on setup files, specific information may be stored for each of the server modules 52, including the IP address of the server module 52. Simple byte-by-byte comparison of such setup files would be bound to result in differences in contents being detected. In such a case, the data items to be compared by the setup comparison method are defined first. Then, the file synchronization method is defined by the setup synchronization method. It is to be noted that while in the present embodiment, the configuration file table 46 stores information indicating the setup comparison and synchronization methods, such information may be stored in the setup parameter table 49 in correspondence with a file name.

<System Operation>

Description will be given below of the operation of the management system of difference data among servers 10 using the flowcharts.

Figure 9:
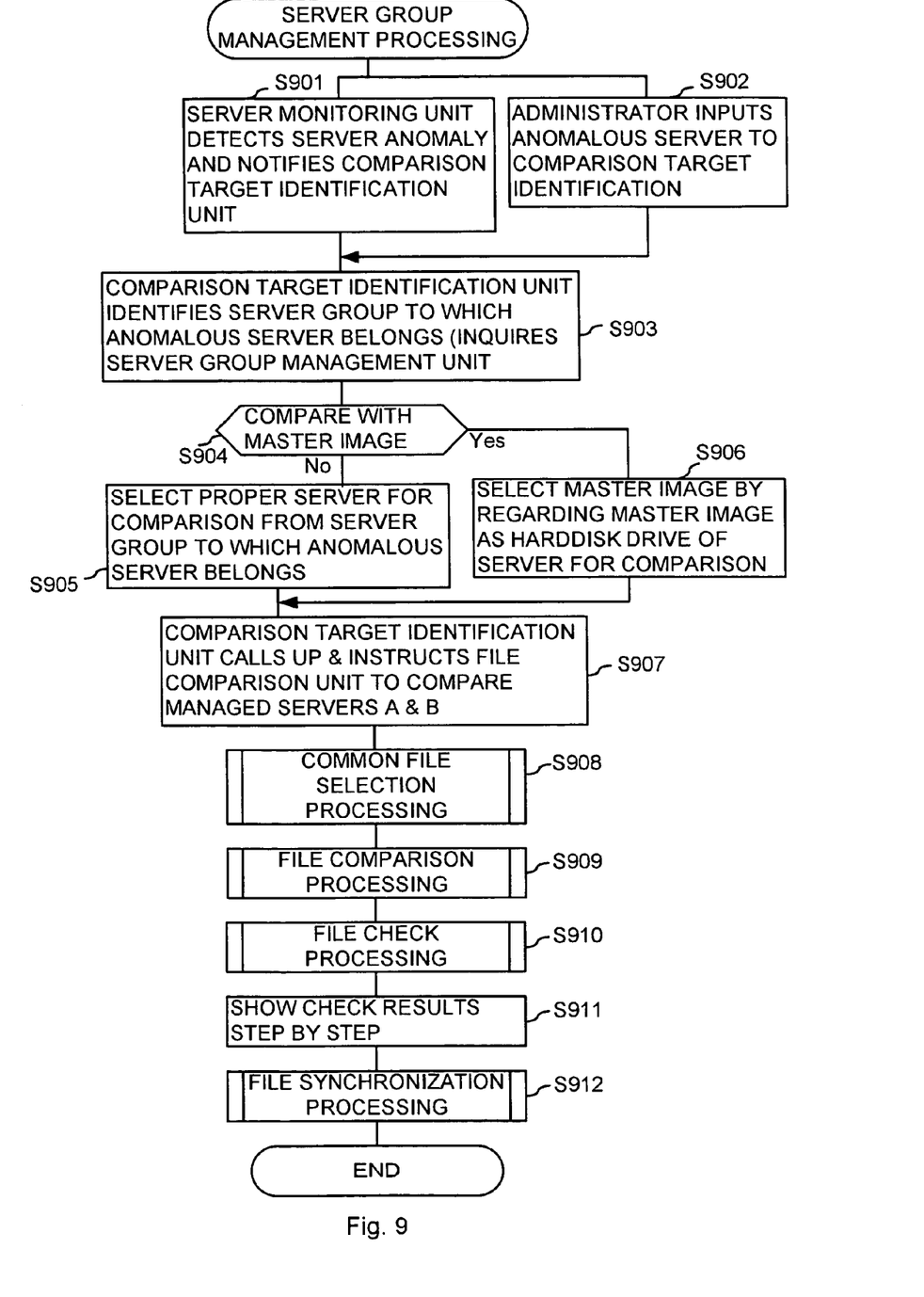
FIG. 9 is a flowchart showing the overall processing flow of the management system of difference data among servers according to the present embodiment.

FIG. 9 is a flowchart showing the overall processing flow of the management system of difference data among servers according to the present embodiment. The server monitoring unit 12 monitors the individual server modules 52 of the blade server 50 for anomalies. In the event of an anomaly in the server module 52, the server monitoring unit 12 notifies the server module 52 found to be anomalous to the comparison target identification unit 11 (S901). Alternatively, the administrator may detect an anomaly in the server module 52 and notify the anomalous server module 52 to the comparison target identification unit 11 via the input device 26 (S902). Here, we assume that the anomalous server module 52 is the managed server A 30. The comparison target identification unit 11 inquires the server group management unit 13 about the server group 53 to which the anomalous managed server A 30 belongs (S903). The server group management unit 13 references the server group table 40, acquiring information indicating the server group 53 to which the managed server A 30 belongs.

The comparison target identification unit 11 verifies whether to compare the managed server A 30 with the master image 45(S904). It is to be noted that whether to compare with the master image 45 may be decided upon in advance or may alternatively be entered by the administrator in the event of an anomaly in the server module 52.

If the comparison is not made with the master image 45, the comparison target identification unit 11 references the server group table 40, selecting one of the server modules 52 belonging to the same server group 53 as the managed server A 30 as the server module 52 for comparison (S905). At this time, the comparison target identification unit 11 selects the server module 52 with the lowest CPU load of those in the same server group 53. On the other hand, when the comparison is made with the master image 45, the comparison target identification unit 11 performs the successive processings by regarding the files stored in the master image 45 as the files stored in the hard disk drive possessed by the server module 52 for comparison (S906). Here, we assume that the server module 52 for comparison is the managed server B 31.

The comparison target identification unit 11 notifies the file comparison unit 15 to compare the managed servers A 30 and B 31 (S907).

Then, a common file selection processing (S908) is performed for selecting the files existing in both the managed servers A 30 and B 31. Next, two processings are performed; a file comparison processing (S909) for comparing the contents of the files existing in both the managed servers A 30 and B 31 and a file check processing (S910) for acquiring the product names of the files different in contents between the managed servers A 30 and B 31.

The difference information output unit 16 outputs the contents of the check list 47 generated by the file check processing (S910) to the output device 27 (S911). To output the contents, the product names, file names and differences may be displayed altogether or step by step. Alternatively, the information may be registered in the setup parameter table 49 that indicates the data item-by-data item impact of data item differences on the server module 52, thus causing the difference information output unit 16 to output this information for the data items found to be different. Among the information indicating the impact on the server module 52 is information to the effect that, for the data item "ABC", if the value of the data item of the managed server A 30 is smaller than that of the managed server B 31, the managed server A 30 is inferior to the managed server B 31 in terms of batch processing capability.

In the end, the file synchronization unit 17 performs a file synchronization processing (S912) for synchronizing the files different between the managed servers A 30 and B 31. It is to be noted that the file synchronization processing (S912) may be performed by the administrator entering an instruction from the input device 26 or performed without receiving an instruction from the administrator.

Figure 10:
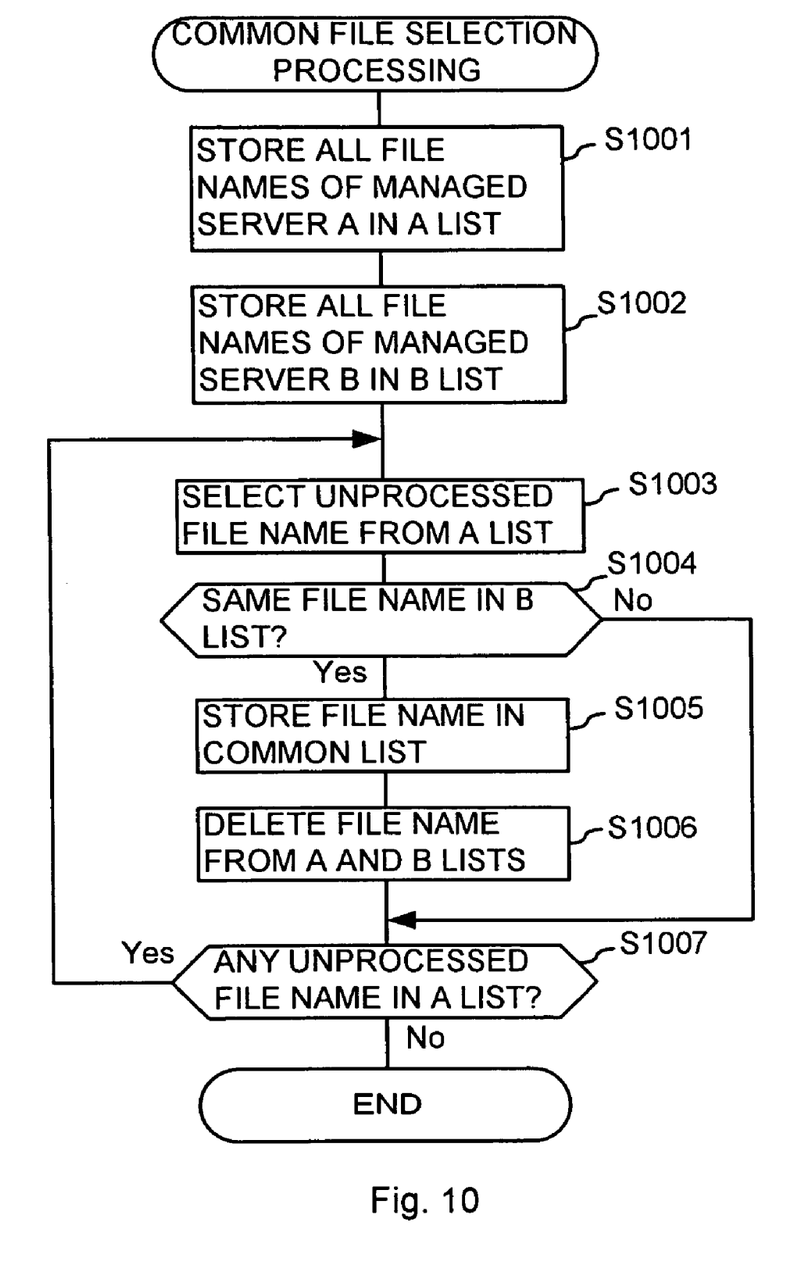
FIG. 10 is a flowchart showing the operation of a common file selection processing according to the present embodiment.

FIG. 10 is a flowchart showing the aforementioned common file selection processing (S908). The file name acquisition request transmission unit 14 transmits a request to the managed server A 30 to transmit the file names of all the files in the managed server A 30. Then, the file name acquisition request transmission unit 14 stores the file names received from the managed server A 30 in the A list 41 (S1001). Similarly, the file name acquisition request transmission unit 14 transmits a request to the managed server B 31 to transmit the file names of all the files in the managed server B 31. Then, the file name acquisition request transmission unit 14 stores the file names received from the managed server B 31 in the B list 42 (S1002). It is to be noted that the file name acquisition request transmission unit 14 may transmit requests to the managed servers A 30 and B 31 to transmit the file names of some of the files instead of all the files possessed by the managed servers A 30 and B 31. For example, the file name acquisition request transmission unit 14 may transmit requests to the managed servers A 30 and B 31 to transmit the file names of only those files stored in the configuration file table 46.

The file comparison unit 15 references a file name stored in the A list 41 (S1003) and verifies whether the same file name is stored in the B list 42 (S1004). If the same file name is stored in the B list 42, the file comparison unit 15 stores the file name in the common list 43 (S1005) and deletes the file name from the A and B lists 41 and 42 (S1006). When the same file name is not stored in the B list 42 or after the file name is deleted from the A and B lists 41 and 42 (S1006), the file comparison unit 15 verifies whether any file names have yet to be referenced in the A list 41 (S1007). If the list has unreferenced file names, the file comparison unit 15 repeats the aforementioned processings (S1003 to S1006). When the common file selection processing is complete for all the file names stored in the A list 41, the common list 43 stores the file names of the files existing commonly in both the managed servers A 30 and B 31. On the other hand, the A list 41 stores the file names of the files existing in the managed server A 30 but not in the managed server B 31. The B list 42 stores the file names of the files existing in the managed server B 31 but not in the managed server A 30.

Figure 11:
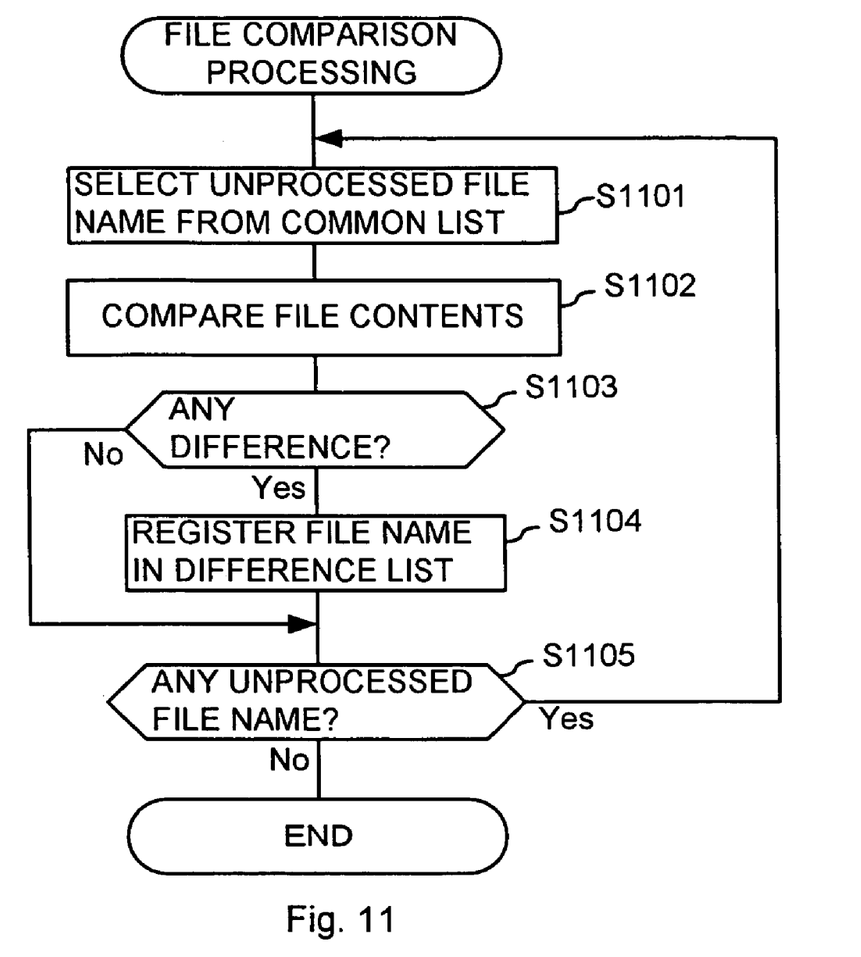
FIG. 11 is a flowchart showing the operation of a file comparison processing according to the present embodiment.

FIG. 11 is a flowchart showing the aforementioned file comparison processing (S909). The file comparison unit 15 references a file name stored in the common list 43 (S1101). Then, the file comparison unit 15 reads out the files indicated by the file name from the managed servers A 30 and B 31 and compares the contents of the two files (S1102). It is to be noted that if a setup comparison method for the file is set in the configuration file table 46 and the setup parameter table 49, the file comparison unit 15 instructs the setup comparison unit 18 to compare the contents of the files in conformity with the setup comparison method. Then, the setup comparison unit 18 compares the contents of the two files in conformity with the setup comparison method. On the other hand, if no setup comparison method is set, the file comparison unit 15 compares the contents of the two files byte by byte. It is to be noted that the comparison of the file contents may be made several bytes at a time instead of byte by byte.

If the file contents are found to be different, the file comparison unit 15 stores the file name of the file in the difference list 44 (S1103).

The file comparison unit 15 verifies whether any file names have yet to be referenced in the common list 43 (S1105). If the list has unreferenced file names, the file comparison unit 15 repeats the aforementioned processings (S1101 to S1104).

While in the present embodiment, the files indicated by the file name are read out from the managed servers A 30 and B 31 for the comparison of the contents of the two files, the file contents may be compared without using the common list 43. For example, the contents of the two files may be compared by referencing the file names stored in the A list 41 and reading out the files indicated by the file name from the managed servers A 30 and B 31. Alternatively, the contents of the files may be compared by reading out the files indicated by the file name stored in the configuration file table 46 from the managed servers A 30 and B 31 without using the A list.

Figure 12:
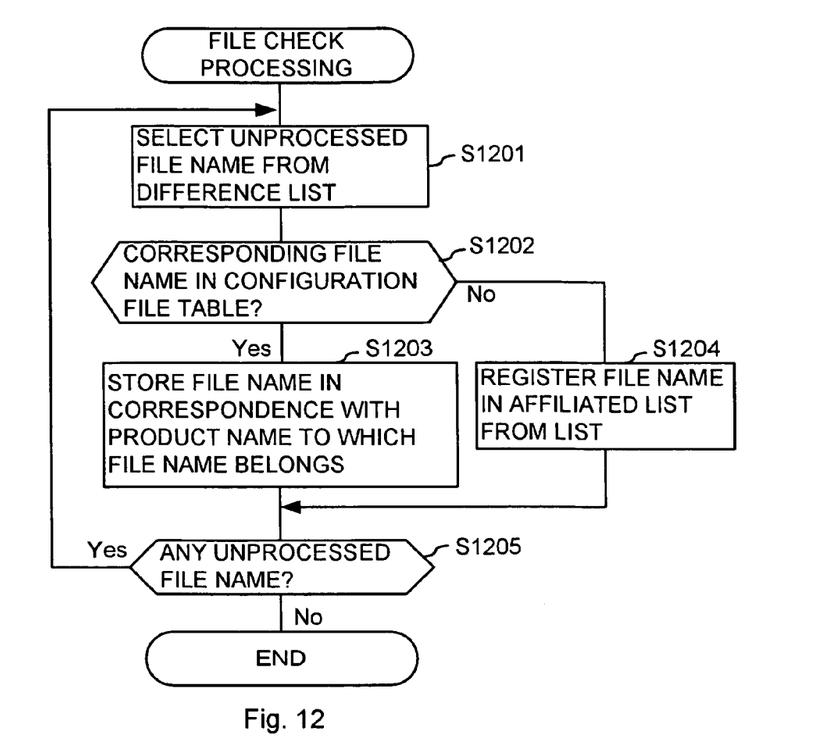
FIG. 12 is a flowchart showing the operation of a file check processing according to the present embodiment.

FIG. 12 is a flowchart showing the aforementioned file check processing (S910). The file check processing is designed to acquire the product name corresponding to the file name from the configuration file table 46. The difference information output unit 16 references a file name stored in the difference list 44 (S1201) and verifies whether the file name is stored in the configuration file table 46 (S1202). If the file name is stored in the configuration file table 46, the difference information output unit 16 stores the file name in the check list 47 in correspondence with the product name stored in the configuration file table 46 (S1203). When the file name is not stored in the configuration file table 46, the difference information output unit 16 stores the file name in the unaffiliated list 48 (S1204). The difference information output unit 16 verifies whether any file names have yet to be referenced in the difference list 44 (S1205). If the list has unreferenced file names, the difference information output unit 16 repeats the aforementioned processings (S1201 to S1204).

The aforementioned file check processing (S910) is intended to acquire the product name corresponding to the file name stored in the difference list 44 and store the file name in the check list 47 using the difference list 44 as an input. It is to be noted that the product name of the file existing only in the managed server A 30 can be verified by performing the file check processing using the A list 41 after the execution of the common file selection processing (S908) as an input. The product name of the file existing only in the managed server B 31 can be similarly verified by performing the file check processing using the B list 42 after the execution of the common file selection processing (S908) as an input.

Figure 13:
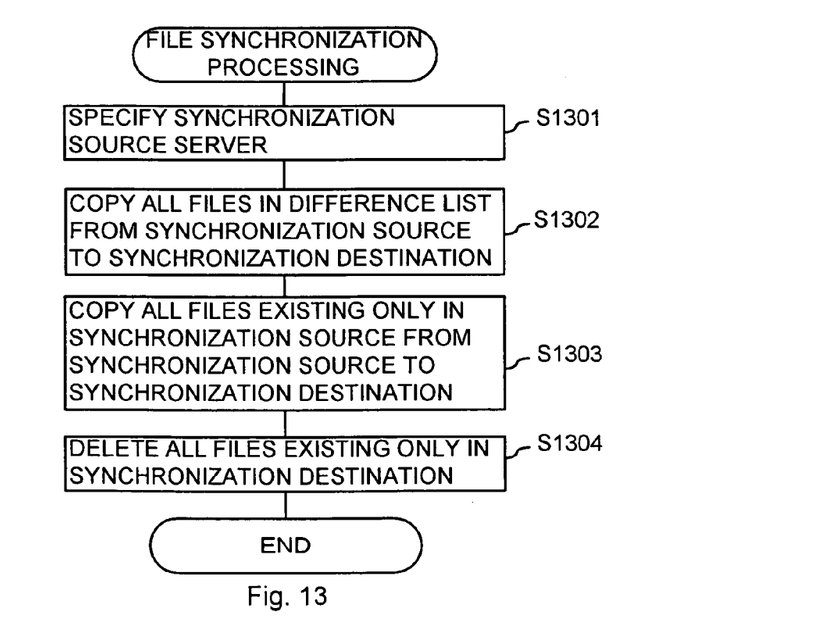
FIG. 13 is a flowchart showing the operation of a file synchronization processing according to the present embodiment.

FIG. 13 is a flowchart showing the aforementioned file synchronization processing (S912). The file synchronization unit 17 specifies a synchronization source server—the server module 52 that will be the file synchronization partner—to the faulty managed server A 30 (S1301). The file synchronization unit 17 can specify the managed server B 31, a server used in the processings up to this point, as the synchronization source server or regard the master image 45 as the hard disk drive of the synchronization source server. Alternatively, the file synchronization unit 17 may select anew the server module 52 to be the synchronization source server from among the server modules 52 belonging to the same server group 53 as the managed server A 30—the synchronization destination server—when the file synchronization processing begins. The efficiency of the file synchronization processing can be enhanced by selecting the server module 52 with the lowest load as the synchronization source server when executing the file synchronization processing.

The file synchronization unit 17 copies the file indicated by the file name stored in the difference list 44 from the synchronization source server to the synchronization destination server (S1302). It is to be noted that if a setup synchronization method for the file is set in the configuration file table 46 and the setup parameter table 49, the file synchronization unit 17 instructs the setup synchronization unit 19 to synchronize the files in conformity with the setup synchronization method. Then, the setup synchronization unit 19 synchronizes the files in conformity with the setup synchronization method. After the file synchronization, the file synchronization unit 17 copies the file indicated by the file name stored in the B list 42 from the synchronization source server to the synchronization destination server (S1303). This allows the file existing only in the synchronization source server to be copied to the synchronization destination server. Then, the file synchronization unit 17 deletes the file indicated by the file name stored in the A list 41 from the synchronization destination server (S1304). This allows the file existing only in the synchronization destination server to be deleted from the synchronization destination server. It is to be noted that the contents to be deleted may be output to the output device 27 before the deletion of the file existing only in the synchronization destination server from the synchronization destination server. Moreover, as for the file output to the output device 27 that will be deleted, a cancellation of the deletion may be entered from the input device 26.

Description has been so far made of the management system of difference data among servers 10. In the presence of two servers with the same file configuration, the system 10 allows detection of differences in files between the two servers, for example, if one of the servers becomes faulty in some way. Additionally, the system 10 allows finding out to which software product the file having differences belongs. That is, the system 10 allows finding out from which software product the cause of the fault derives, allowing to properly determine countermeasures against the fault. For instance, if the file found to be different in contents belongs to database management software, the administrator can pin down the cause of the fault by investigating information such as the error information output by the database management software.

The faulty server can be restored by copying the file found to be different in contents from the server that is not faulty.

Possible changes to the server file configuration need not be considered by acquiring the file name from the faulty server, instead of storing in advance the file names for comparison in a list such as the A list 41. That is, if files for comparison are stored in advance, the files for comparison must be maintained each time the server file configuration changes. For this reason, acquiring the file names possessed by the server at the time of the file comparison eliminates the need to maintain the files for comparison.

The file comparison can be made with the master image 45 instead of using two servers. In the absence of a server with the same file configuration as the faulty server, the differences with the file at the time of the installation can be detected by comparing with the file stored in the master image 45. Even in the presence of another server with the same file configuration as the faulty server, comparing with the file stored in the master image 45 can suppress the data input/output load on the another server. This keeps intact the processing capability of the information processing system running in the another server.

If the server group is made up of a plurality of servers with the same configuration files as in the case of blade servers, one can select the server with the lowest CPU load in the same server group as the faulty server as the server for comparison. That is, in the server group to which the faulty server belongs, one can select the server that allows minimizing the impact on other information processing systems and efficiently performing the comparison processing, as the server for comparison.

On the other hand, changing the comparison method for each data item may be more appropriate than the simple byte-by-byte comparison of file contents. For example, some data item values of a setup file are character strings while others are numbers. Additionally, in the case of a number, the number may be both in decimal and hexadecimal forms. In such a case, simple byte-by-byte comparison as data will lead to a difference. For this reason, a match of data item values can be verified by determining a comparison method—making a comparison as a character string, after conversion to a decimal number and so on—for each data item and comparing the data item values in conformity with the comparison method.

While description has been made above of the present embodiment, the aforementioned embodiment is intended to facilitate the understanding of the present invention and not for restrictive interpretation of the invention. The present invention may be modified or improved upon without departing from the spirit of the invention and includes equivalents thereof.

For example, in the present embodiment, the managed servers A 30 and B 31 are not limited to the server modules 52 belonging to the same server group 53 housed in the blade server 50 and need only be information processing apparatuses installed with the same software products.

On the other hand, the server management system 10 may be running on the managed server A 30 or B 31. That is, the management agent 34 of the faulty server or server for comparison may perform the above-described processings rather than providing an information processing apparatus specifically designed for the management.

While the illustrative and presently preferred embodiment of the present invention has been described in detail herein, it is to be understood that the inventive concepts may be otherwise variously embodied and employed and that the appended claims are intended to be construed to include such variations except insofar as limited by the prior art.

What is claimed is:

1. A management system of difference data among servers, the management system comprising:
   a first server;
   a second server;
   a CPU;
   and a memory;
   the CPU and the memory being communicatively connected to the first server and the second server;
   the first server and the second server installed with same software products, the management system further comprising:
   a file name storage unit including:
      a first list, the first list including file names and file path information of files located on the first server, the files having been created by installation of the software products realized by execution of a program stored in the memory by the CPU, and a second list, the second list including file names and file path information of files located on the second server, the files having been created by installation of the software products realized by execution of the program stored in the memory by the CPU;

a configuration information storage unit including information for each file located on the first server and the second server, the information for said each file including product name of the corresponding software product, file name, file path information, file attributes, a setup comparison method, and a setup synchronization method;

a setup parameter table, to store setup comparison information indicating a data comparison method and setup synchronization information indicating a data synchronization method in correspondence with the file names;

a setup comparison unit, to create a third list, the third list including common file names that are common to the first list and the second list, and to compare contents of those first files in the first server with contents of second files in those second server corresponding to the common file names in accordance with the setup comparison method, when the setup comparison method is set in the configuration information storage unit and the parameter table;

a file comparison unit to create a fourth list, the fourth list including the file names of the files having different contents, wherein the file names are determined after comparison by the setup comparison unit; and a setup synchronization unit, to synchronize data items of the files in the first server having the file names listed in the fourth list with data items of the files in the second server having the file names listed in the fourth list, the synchronization being performed according to the setup synchronization method when the setup synchronization method is set in the configuration information storage unit and the setup parameter table, wherein the data items of files include information specific to a server and information not specific to a server;

wherein the setup comparison method is not defined for the data items specific to a server and the setup comparison method is defined for the data items not specific to a server; and wherein the setup synchronization, is performed data item by data item.

2. The management system of difference data among servers of claim 1, wherein the data items specific to a server include an IP address.

3. The management system of difference data among servers of claim 1, wherein the file created by installation of the software products is a setup file.

4. The management system of difference data among servers of claim 1, wherein the data items of the files having information specific to a server and information not specific to a server are listed in the third list.

5. A control method executed in an information processing apparatus having a first server, a second server, a CPU, and a memory, the CPU and the memory being communicatively coupled to the first server and the second server, the first server and the second server being installed with one or a plurality of software products, the control method comprising the steps of, by the information processing apparatus:

storing, in a file name storage unit,
a first list including file names with file path information of files possessed by the first server, the files being created by the installation of the software products realized by execution of a program stored in the memory executed by the CPU, and a second list including file names with file path information of files possessed by the second server, the files being created by the installation of the software products realized by execution of the program stored in the memory by the CPU;

storing, in a configuration information storage unit,
file names with file path information of files in correspondence with product names indicating the software products used for installing the files, file attributes corresponding to the files, a setup comparison method corresponding to the files, and a setup synchronization method corresponding to the files;

storing, in a setup parameter table,
a setup comparison information indicating a data comparison method and a setup synchronization information indicating a data synchronization method in correspondence with the file names; creating, by a setup comparison unit, a third list including file names of the files commonly listed in the first list and the second list, and for comparing contents of the files in the first server having the file names listed in the third list with contents of the files in the second server having the file names listed in the third list, according to the setup comparison method, when the setup comparison method is set in the configuration information storage unit and the parameter table;

creating, by a file comparison unit,
a fourth list including the file names of the files having different contents, wherein the file names are selected by the setup comparison unit after comparing the files; and synchronizing, by a setup synchronization unit,
data items of the files located in the first server and listed in the fourth list with data items of the files located in the second server and listed in the fourth list according to the setup synchronization method when the setup synchronization method is set in the configuration information storage unit and the setup parameter table, wherein data items of files have information specific to a server and information not specific to a server;

wherein the setup comparison method is not defined for the data items specific to a server and the setup comparison method is defined for the data items not specific to a server; and wherein the setup synchronization method for data items, the data items for which the setup comparison method is defined, is configured to be performed data item by data item.

6. The control method of claim 5, wherein the data items specific to a server include an IP address.

7. The control method of claim 5, wherein the file created by installation of the software products is a setup file.

8. The control method of claim 5, wherein the data items of the files having information specific to a server and information not specific to a server are listed in the third list.

* * * * *

UNITED STATES PATENT AND TRADEMARK OFFICE
CERTIFICATE OF CORRECTION

PATENT NO. : 7,590,670 B2 Page 1 of 1
APPLICATION NO. : 10/998284
DATED : September 15, 2009
INVENTOR(S) : Sasaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 520 days.

Signed and Sealed this

Fourteenth Day of December, 2010

David J. Kappos
*Director of the United States Patent and Trademark Office*